(12) United States Patent
Lubanski

(10) Patent No.: US 7,838,772 B2
(45) Date of Patent: *Nov. 23, 2010

(54) TAPERED TRANSITION RAMP FOR CABLE PROTECTOR

(75) Inventor: Thomas M. Lubanski, Claremont, CA (US)

(73) Assignee: Peterson Systems International, Inc., Duarte, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/508,037

(22) Filed: Jul. 23, 2009

(65) Prior Publication Data

US 2009/0283298 A1    Nov. 19, 2009

Related U.S. Application Data

(63) Continuation of application No. 11/691,311, filed on Mar. 26, 2007, now Pat. No. 7,595,450, which is a continuation-in-part of application No. 11/379,442, filed on Apr. 20, 2006, now Pat. No. 7,674,980.

(51) Int. Cl.
*H02G 3/30* (2006.01)
*H02G 3/04* (2006.01)

(52) U.S. Cl. .................. 174/97; 174/68.1; 174/101; 174/72 C; 104/275; 14/69.5

(58) Field of Classification Search .................. 174/101, 174/135, 97, 50, 70 R, 72 C, 72 A, 99 R, 174/68.1, 70 C, 95, 481, 482, 484; 220/3.2, 220/3.3; 248/74.1, 68.1, 74.2; 14/69.5; 104/275; 138/103, 105, 106, 110, 155, 157; D13/155; 439/120, 209, 212, 216; 52/220.5
See application file for complete search history.

(56) References Cited

U.S. PATENT DOCUMENTS

| 72,028 | A | 12/1867 | Haase |
|---|---|---|---|
| 585,540 | A | 6/1897 | Spangler |
| 883,186 | A | 3/1908 | Fine |
| 1,914,830 | A | 6/1933 | Kostohris |
| 2,027,619 | A | 1/1936 | Rutherford |
| 2,079,274 | A | 5/1937 | Baker |
| 2,166,031 | A | 7/1939 | Wendell |
| 2,299,356 | A | 10/1942 | Strohm et al. |

(Continued)

FOREIGN PATENT DOCUMENTS

DE    20012041 U1    2/2001

*Primary Examiner*—Angel R Estrada
(74) *Attorney, Agent, or Firm*—Holland & Hart

(57) ABSTRACT

An exemplary ramp structure capable of being positioned over at least a portion of a cable protection system comprises a center portion, a first side ramp portion adjacent a side of the center portion, and a first tapered portion adjacent an end of the first side ramp portion. The first tapered portion may be tapered in both a first direction and a second direction that is substantially orthogonal to the first direction. The first tapered portion may be integrally formed with the first side ramp portion and the first side ramp portion may be integrally formed with the center portion. An exemplary cable protection system is also disclosed comprising a first cable protector structured to receive one or more cables, a first side ramp adjacent a side of the first cable protector, and a first tapered structure pivotally attachable to an end of the first side ramp.

37 Claims, 15 Drawing Sheets

U.S. PATENT DOCUMENTS

| | | | |
|---|---|---|---|
| 2,594,425 A | 4/1952 | Greenberg | |
| 2,927,396 A | 3/1960 | Hall, Jr. | |
| 3,118,017 A | 1/1964 | Wimbish | |
| 3,725,580 A | 4/1973 | Thompson et al. | |
| 3,878,317 A | 4/1975 | Plaskon | |
| 3,888,186 A | 6/1975 | Jentzsch et al. | |
| 3,965,967 A | 6/1976 | Jentzsch et al. | |
| 4,067,258 A | 1/1978 | Valeri | |
| 4,101,100 A | 7/1978 | Smith et al. | |
| 4,192,062 A | 3/1980 | Balde et al. | |
| 4,373,306 A | 2/1983 | Rech | |
| 4,677,799 A | 7/1987 | Zarembo | |
| 4,817,224 A | 4/1989 | Visnaw et al. | |
| 4,819,910 A | 4/1989 | Johnston | |
| 5,095,822 A | 3/1992 | Martin | |
| 5,267,367 A | 12/1993 | Wegmann, Jr. | |
| 5,446,937 A | 9/1995 | Haskins | |
| 5,566,622 A | 10/1996 | Ziaylek, Jr. et al. | |
| 5,777,266 A | 7/1998 | Herman et al. | |
| D412,490 S | 8/1999 | Henry | |
| 5,933,898 A | 8/1999 | Estes et al. | |
| D415,112 S | 10/1999 | Henry | |
| D415,471 S | 10/1999 | Henry | |
| D418,818 S | 1/2000 | Henry | |
| D429,695 S | 8/2000 | Henry | |
| D436,578 S | 1/2001 | Henry | |
| D437,832 S | 2/2001 | Henry | |
| 6,202,565 B1 | 3/2001 | Henry | |
| 6,481,036 B1 | 11/2002 | Duvall | |
| 6,498,297 B2 | 12/2002 | Samhammer | |
| 6,747,212 B1 | 6/2004 | Henry | |
| 6,878,881 B1 | 4/2005 | Henry | |
| 7,309,836 B2 * | 12/2007 | Lubanski | 174/101 |
| 7,385,139 B2 * | 6/2008 | Lubanski | 174/97 |
| D583,771 S * | 12/2008 | Lubanski | D13/155 |
| 7,592,547 B2 * | 9/2009 | Lubanski | 174/101 |
| 7,595,450 B2 * | 9/2009 | Lubanski | 174/97 |
| 7,674,980 B2 * | 3/2010 | Lubanski | 174/97 |
| 2002/0038716 A1 | 4/2002 | Pineda | |

* cited by examiner

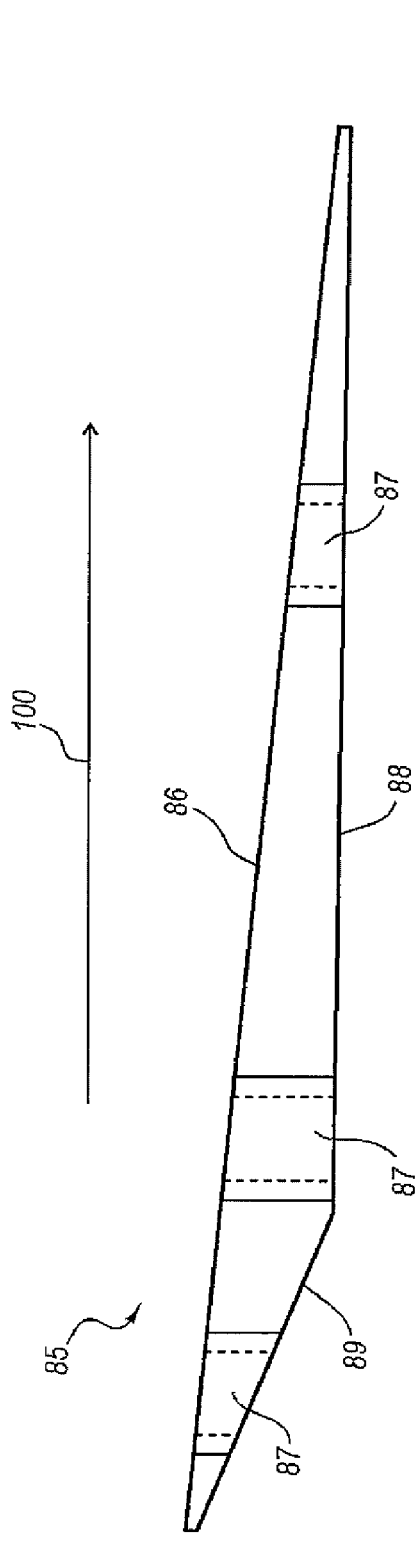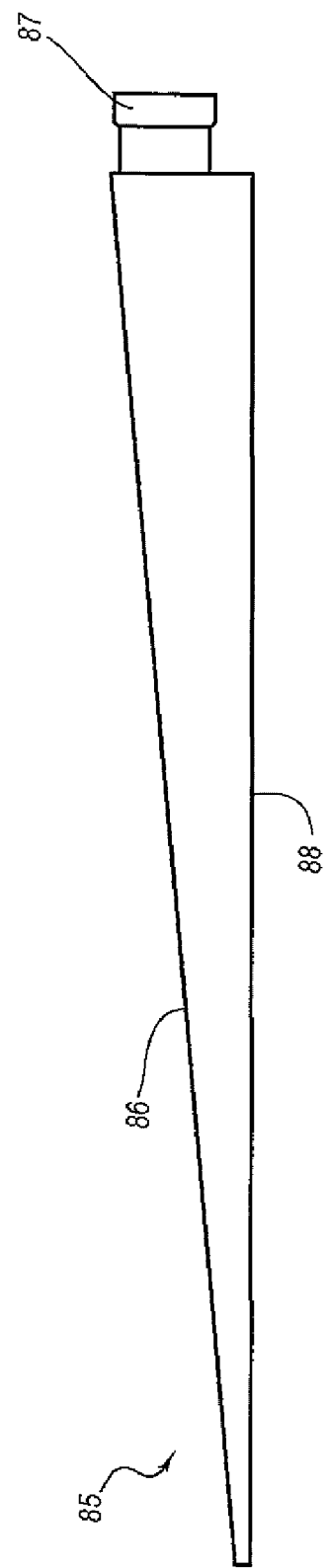
*Figure 4A*
*Figure 4B*

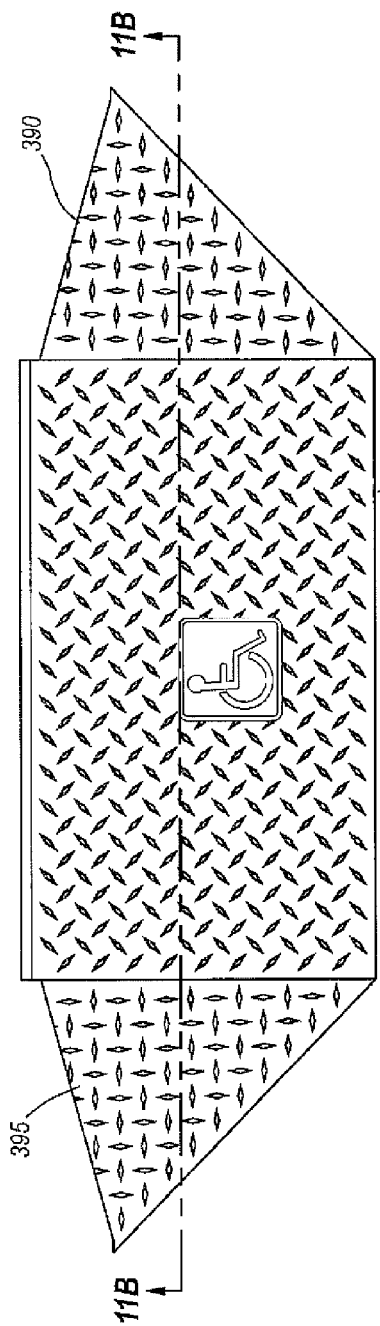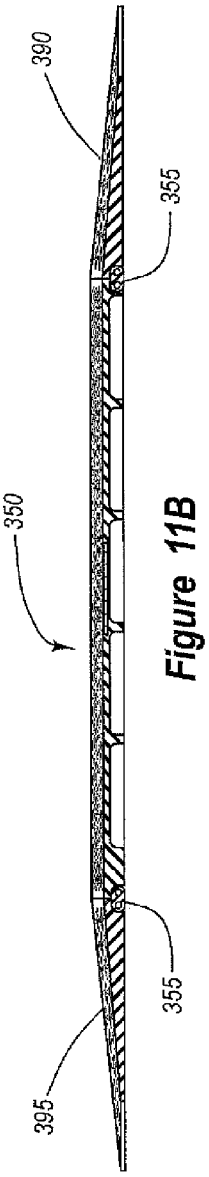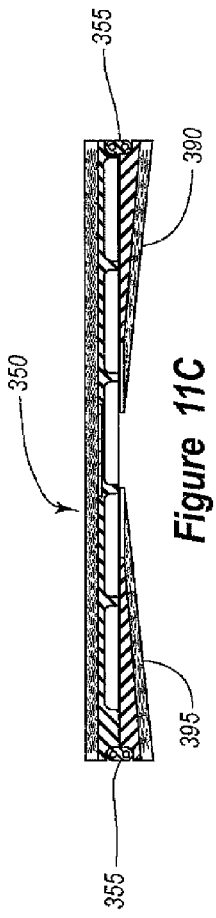
Figure 11A
Figure 11B
Figure 11C

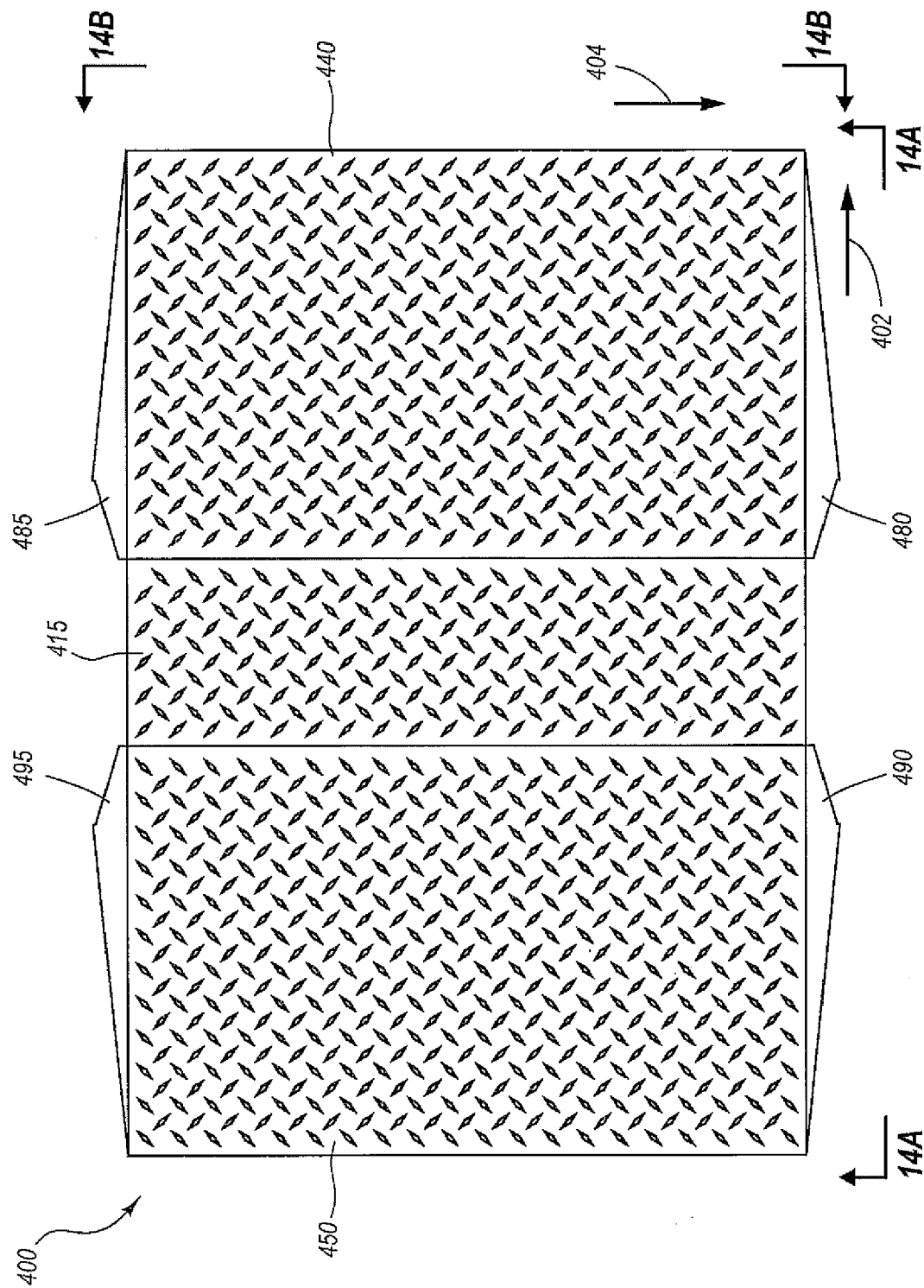

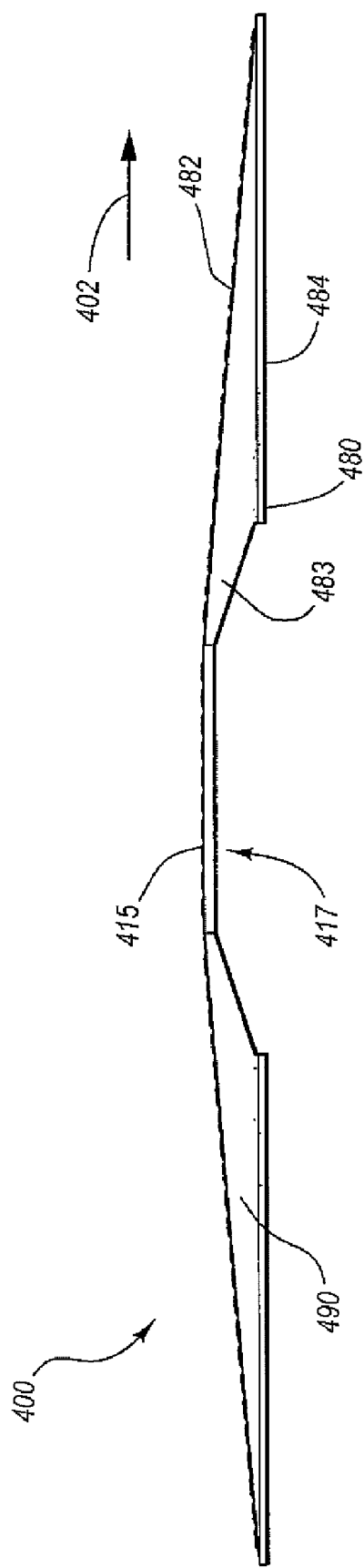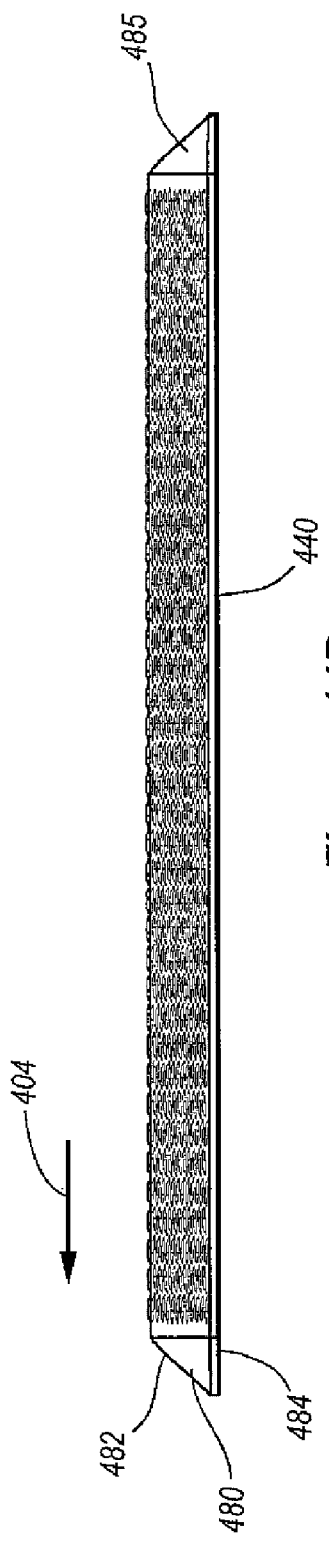
Figure 14A
Figure 14B

TAPERED TRANSITION RAMP FOR CABLE PROTECTOR

CROSS REFERENCE TO RELATED APPLICATIONS

This application is a continuation of U.S. patent application Ser. No. 11/691,311, filed 26 Mar. 2007, which is a continuation-in-part of U.S. application Ser. No. 11/379,442, filed 20 Apr. 2006, the disclosures of which are incorporated, in their entirety, by this reference.

FIELD OF THE INVENTION

The instant disclosure relates generally to cable protectors and cable protection systems.

BACKGROUND

Over the years, various devices and apparatuses have been developed in an effort to protect hoses, cables, wiring, and the like from physical damage. In particular, numerous cable protector designs have been developed to protect cabling extending across walkways, roadways, and construction sites from physical damage caused by pedestrians, vehicular traffic, and other such external elements. Cable protectors have also proven useful in helping to minimize the risk of pedestrians tripping over such cabling. For the purposes of this disclosure, the terms "cable" and "cabling" shall be broadly construed to include data cables, hoses, electrical wiring, telephone cables, conduits, optical fibers, pneumatic tubing, plumbing, and any other length of material.

Conventional cable protectors typically include one or more channels extending in parallel between opposing ends of the cable protector to receive one or more cables. Side ramps may extend laterally outward from, or may be removably attachable to, the sides of the cable protector to allow vehicles and the like to roll over the top of the cable protector. In some cases, these side ramps are configured to have a relatively gradual slope so that a wheelchair, walker, or the like can pass over the cable protector with minimal effort. In accordance with guidelines established by the Americans with Disabilities Act ("ADA"), many conventional cable protectors and ramps are also equipped with side rails to prevent people or wheelchairs from slipping off the sides of the cable protector or side ramp. These side rails are typically positioned substantially parallel to the ends of the cable protector and/or side ramp.

Although conventional side rails are generally effective in preventing wheelchairs, walkers, strollers, and the like from sliding off the ends of the ramp, these rails may limit the range of use of the cable protector. For example, the conventional parallel configuration of side rails, which typically extend at least two inches above the cable protector's surface, mandates that a user of a wheelchair, walker, stroller, or the like approach the cable protector in a direction substantially parallel to the side rails. In other words, conventional side rails may prevent users of wheelchairs, walkers, and strollers from approaching the cable protector and/or side ramp from directions or angles that intersect with the parallel side rails. Similarly, the parallel configuration of these side rails requires that such users travel in a substantially straight line over the cable protector and side ramps in order to avoid a collision with the side rails.

Accordingly, a need exists for a cable protection system in which users of wheelchairs, walkers, strollers, and the like may approach and cross over the system from a wider range of directions and angles.

SUMMARY

According to at least one embodiment, a cable protection system comprises a first cable protector having a first side, at least one channel extending between opposing ends of the first cable protector and structured to receive at least one cable, a first side ramp adjacent the first side of the first cable protector, and a tapered structure adjacent at least one end of the first side ramp. The tapered structure may be tapered in both a first direction and a second direction, and the first direction may be substantially orthogonal to the second direction.

In certain embodiments, the tapered structure comprises a substantially planar top surface. The tapered structure may also be removably attachable to, or integrally formed with, the first side ramp. The tapered structure may be substantially triangular in shape, may comprise at least one rounded end, or may be formed in any number of other suitable shapes and sizes.

In at least one embodiment, the cable protection system further comprises a second cable protector having a first side connected in series with the first cable protector and a second side ramp adjacent the first side of the second cable protector. The second side ramp may be configured to have a slope that is steeper than a slope of the first side ramp and the tapered structure may be configured to overlap at least a portion of the second side ramp. In many embodiments, the tapered structure provides a gradual transition between: 1) an end of the first side ramp and a surface beneath the cable protection system; and 2) the first side of the second cable protector and the surface beneath the cable protection system.

According to certain embodiments, a tapered transition ramp for a cable protection system comprises a top surface, a bottom surface, a first end, and at least one connector provided at the first end and configured to removably attach the tapered transition ramp to a first side ramp of the cable protection system. The top surface of the tapered transition ramp may be tapered in both a first direction and a second direction, with the first direction substantially orthogonal to the second direction. The top surface may also be configured to be substantially planar.

The tapered transition ramp may be substantially triangular in shape, may comprise a rounded second end, or may be formed in any number of other suitable shapes and sizes. The tapered transition ramp may also further comprise an overlapping side portion configured to overlap at least a portion of a second side ramp of the cable protection system.

In at least one embodiment, an exemplary method of assembling a cable protection system comprises providing a first cable protector having a first side, providing a first side ramp adjacent the first side of the first cable protector, and providing a tapered structure adjacent at least one end of the first side ramp. The tapered structure may be tapered in both a first direction and a second direction, with the first direction substantially orthogonal to the second direction. The tapered structure may comprise a substantially planar top surface and may be substantially triangular in shape, may comprise at least one rounded end, or may be formed in any number of other suitable shapes and sizes.

According to certain embodiments, the step of providing the first side ramp adjacent the first side of the first cable protector comprises removably attaching the first side ramp to the first side of the first cable protector. In addition, the step of providing the tapered structure adjacent at least one end of the first side ramp may comprise removably attaching the tapered structure to at least one end of the first side ramp. Similarly, the step of providing the tapered structure adjacent at least one end of the first side ramp may comprise integrally forming the tapered structure with the first side ramp.

In at least one embodiment, the method further comprises removably attaching a second cable protector in series with the first cable protector, providing a second side ramp adjacent a first side of the second cable protector, with the second side ramp configured to have a slope that is steeper than a slope of the first side ramp, and overlapping the tapered structure over at least a portion of the second side ramp.

In an additional embodiment, a ramp structure capable of being positioned over at least a portion of a cable protection system may comprise a center portion, a first side ramp portion adjacent a first side of the center portion, and a first tapered portion adjacent a first end of the first side ramp portion. The first tapered portion may be tapered in both a first direction and a second direction that is substantially orthogonal to the first direction.

In certain embodiments, the first tapered portion may be integrally formed with the first side ramp portion and the first side ramp portion may be integrally formed with the center portion. The ramp structure may also comprise a recess configured to receive a portion of a complimentary shaped cable protection system. The ramp structure may also comprise a second tapered portion integrally formed with a second end of the first side ramp portion, a second side ramp portion integrally formed with a second side of the center portion, a third tapered portion integrally formed with a first end of the second side ramp portion, and a fourth tapered portion integrally formed with a second end of the second side ramp portion.

In an additional embodiment, a cable protection system may comprise a first cable protector structured to receive at least one cable, a first side ramp adjacent a first side of the first cable protector, and a first tapered structure pivotally attachable to a first end of the first side ramp. A top surface of the first tapered structure may be tapered in both a first direction and a second direction, and the first direction may be substantially orthogonal to the second direction.

In certain embodiments, the cable protection system may comprise a second cable protector connected in series with the first cable protector and a second side ramp positioned adjacent a first side of the second cable protector and configured to have a slope that is steeper than a slope of the first side ramp. In at least one embodiment, the first tapered structure may be configured to overlap at least a portion of the second side ramp. The cable protection system may also comprise a second tapered structure pivotally attachable to a second end of the first side ramp, a second side ramp adjacent a second side of the first cable protector, a third tapered structure pivotally attachable to a first end of the second side ramp, and a fourth tapered portion pivotally attachable to a second end of the second side ramp. The first and second side ramps may be integrally formed with or removably attachable to the first cable protector.

In an additional embodiment, a side ramp assembly for a cable protector may comprise a first side ramp and a first tapered structure pivotally attachable to a first end of the first side ramp. A top surface of the first tapered structure may be tapered in both a first direction and a second direction, and the first direction may be substantially orthogonal to the second direction.

Features from any of the above-mentioned embodiments may be used in combination with one another in accordance with the general principles described herein. These and other embodiments, features and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4A is an end view of the exemplary tapered transition structure illustrated in FIG. 3, taken along line 4A-4A;

FIG. 4B is a side view of the exemplary tapered transition structure illustrated in FIG. 3, taken along line 4B-4B;

FIG. 11A is a top view of the exemplary side ramp assembly illustrated in FIG. 10;

FIG. 11B is a cross-sectional side view of the exemplary side ramp assembly illustrated in FIG. 11A in a first position, taken along line 11B-11B;

FIG. 11C is a cross-sectional side view of an exemplary side ramp assembly in a second position;

FIG. 13 is a top view of the exemplary ramp structure illustrated in FIG. 12;

FIG. 14A is an end view of the exemplary ramp structure illustrated in FIG. 13, taken along line 14A-14A;

FIG. 14B is a side view of the exemplary ramp structure illustrated in FIG. 13, taken along line 14B-14B.

Figure 1:
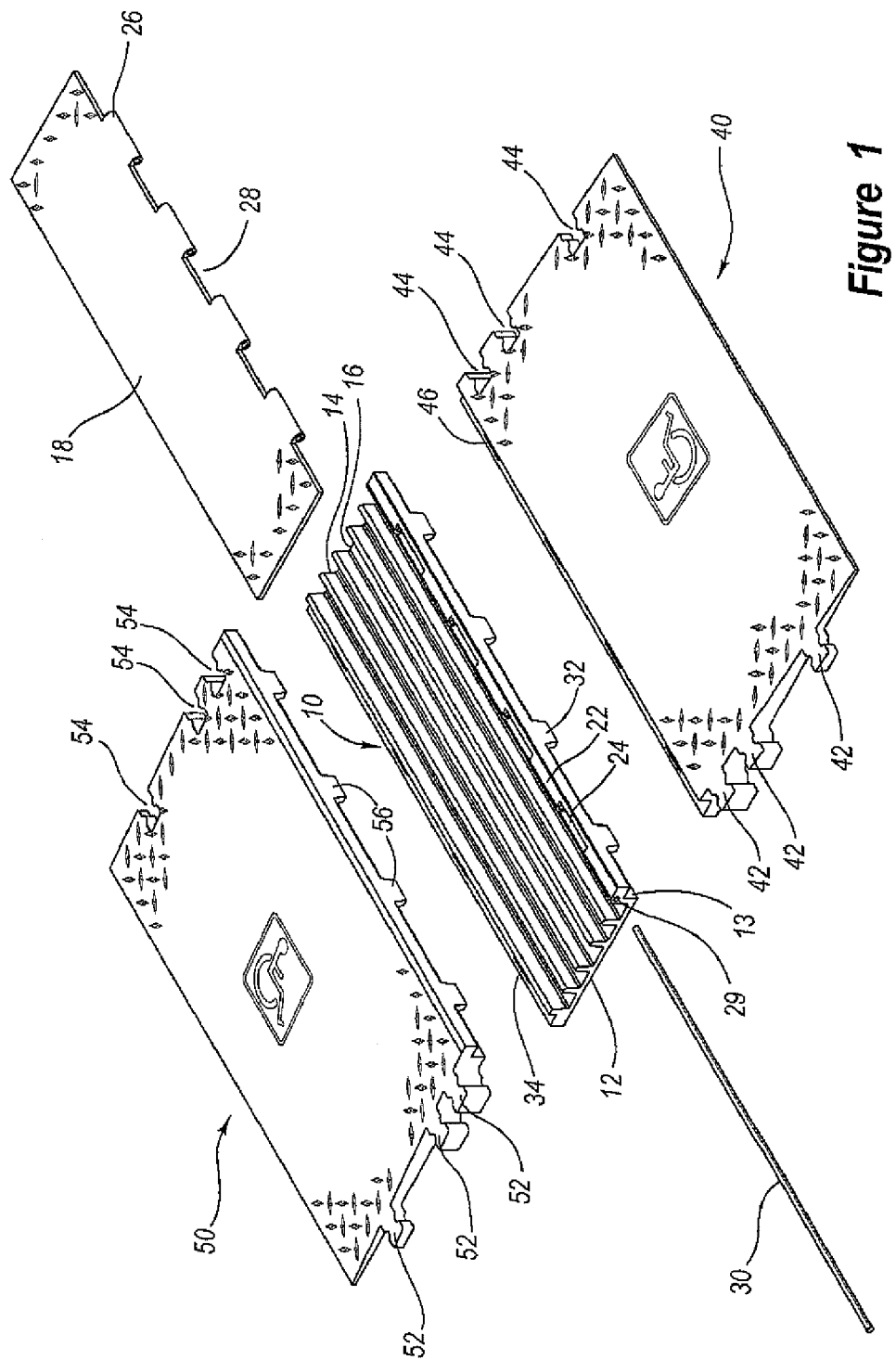
FIG. 1 is an exploded perspective view of a cable protection system according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, one of skill in the art will understand that the exemplary embodiments described herein are not intended to be limited to the particular forms disclosed. Rather, the instant disclosure covers all modifications, equivalents, and alternatives falling within the scope defined by the appended claims.

DETAILED DESCRIPTION OF EXEMPLARY EMBODIMENTS

Figure 2:
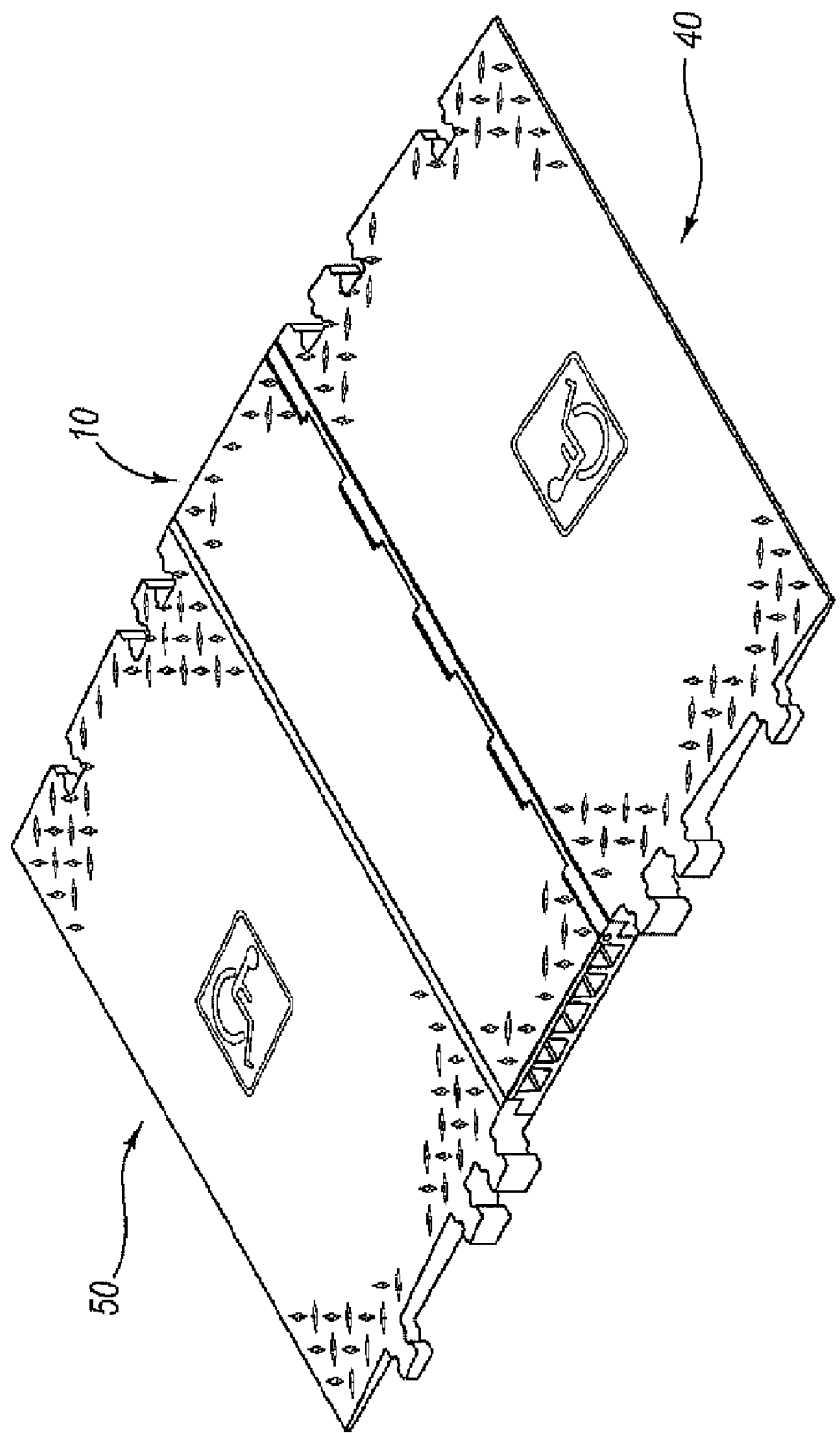
FIG. 2 is an assembled perspective view of the exemplary cable protection system illustrated in FIG. 1.

FIG. 1 is an exploded perspective view of a cable protection system according to at least one embodiment. FIG. 2 is an assembled perspective view of the exemplary cable protection system illustrated in FIG. 1. In at least one embodiment, the exemplary cable protection system illustrated in these figures comprises a cable protector 10, a first side ramp 40, and a second side ramp 50.

As seen in FIGS. 1 and 2, in certain embodiments cable protector 10 comprises a base member 12 having a pair of opposing side walls 13. Base member 12 may be substantially rectangular, as illustrated in FIGS. 1-2, or formed in any number of other shapes or sizes, such as a square or other multi-sided shape. In certain embodiments, opposing side walls 13 form a single channel extending within base member 12 for housing one or more cables. Alternatively, as illustrated in FIG. 1, one or more vertically extending rib members 14 may longitudinally divide the length of base member 12 into a plurality of longitudinal channels 16 for housing one or more cables. As seen in FIG. 1, rib member 14 may be formed to have a height that is generally coextensive with the height of the side walls 13 of base member 12.

Advantageously, when a plurality of cables are housed within base member 12, rib members 14 may act as barriers between the longitudinally extending cables to minimize tangling, electrical interference, and the like. As detailed above, numerous forms of cables and wires may be housed within base member 12; including, for example, data cables, hoses, electrical wiring, telephone cables, conduits, optical fibers, pneumatic tubing, plumbing, and any other length of material.

In the exemplary embodiments illustrated in FIGS. 1-2, a cover 18 may be pivotally attached to base member 12 by a hinge structure. In this exemplary embodiment, the hinge structure may comprise a plurality of alternately spaced hinge members 22 formed on an upper surface of one of the side walls 13 of base member 12, and a plurality of alternately spaced hinge members 26 formed on one side of cover 18. In certain embodiments, hinge members 22 and 26 are formed in a hollow, tubular shape so as to be capable of housing a cylindrical or rod-like member, such as a hinge rod or pin. Although illustrated in FIGS. 1-2 as a substantially continuous hinge structure, this hinge structure may also be formed of any number of hinge structures known to those of skill in the art; including, for example, a flush hinge, a barrel hinge, a butt hinge, or a concealed hinge.

As seen in FIG. 1, hinge members 22 may be spaced along side wall 13 of base member 12 so as to mate with an equal number of recesses 28 of similar dimension defined along the side of cover 18. Similarly, hinge members 26 may be spaced along the side of cover 18 so as to mate with an equal number of recesses 24 of similar dimension defined along the upper surface of side wall 13 of base member 12. The lengths, widths and depths of recesses 24, 28 may be defined to be slightly larger than those of hinge members 22, 26, respectively, in order to allow hinge members 22, 26 to be easily inserted into recesses 24, 28. When properly mated and aligned, hinge members 22, 26 define a substantially continuous passageway 29 extending throughout the length of the aligned hinge members. In certain embodiments, passageway 29 is defined so as to be substantially cylindrical.

In at least one exemplary embodiment, a rod member 30 is inserted throughout the passageway 29 defined by the aligned hinge members 22, 26 to pivotally hinge cover 18 to base member 12. Although rod member 30 may be formed to be substantially cylindrical, rod member 30 may also be formed of any structure or shape capable of hinging opposing structures. The various elements of hinge structure 20 may thus enable cover 18 to freely pivot about rod member 30 as cable protector 10 is opened and closed. When in a closed position, cover 18 may rest upon the upper surfaces of side walls 13 and/or rib members 14 to cover channels 16 and to protect any cables housed therein.

As seen in FIG. 1, base member 12 may also comprise one or more connectors 32 configured to removably attach cable protector 10 to a side of first side ramp 40. In many embodiments, connectors 32 are substantially vertically oriented; that is, they extend generally perpendicular to the horizontal plane defined by cover 18. Although connectors 32 are illustrated in FIG. 1 as extending generally downwards towards the ground, connectors 32 may also be configured to extend generally up and away from the ground. Generally speaking, connectors 32 may be formed of any number of shapes or structures capable of interlocking with, or being inserted into, an opposing structure; including, for example, a substantially vertically extending protrusion, a ball-shaped structure capable of interconnecting with a socket to form a ball-and-socket joint, a cantilever configured to "snap fit" into a complimentary recess, or the like.

In at least one embodiment, connectors 32 are configured to be insertable into one or more apertures 46 formed in first side ramp 40. In many embodiments apertures 46 are defined within first side ramp 40 so as to be substantially vertically oriented. According to this exemplary embodiment, apertures 46 are defined in a general slot shape that embodies the inverse of the dimensions of connectors 32. Alternatively, apertures 46 may be formed of any number of other shapes capable of receiving the various possible configurations of connectors 32 (described in greater detail above); including, for example, a circular socket (capable of interlocking with the ball-shaped embodiment of connector 32), a cubic or rectangular aperture or recess (capable of receiving the substantially vertical protrusion embodiment of connector 32), or the like. Connectors 32 may also be configured to snap fit into apertures 46 defined in first side ramp 40 to removably attach first side ramp 40 to cable protector 10.

In at least one embodiment, first side ramp 40 comprises a tapered structure having one or more male end connectors 42 formed on one of its ends, and one or more female end connectors 44 formed on its opposing end. Additionally or alternatively, one or male end connectors 42 and one or more female end connectors 44 may be provided on the same end of first side ramp 40. Although illustrated in FIGS. 1-3 as being formed in a general hourglass shape, end connectors 42, 44 may be formed of any shape or connecting structure known to those in the art; including, for example, complimentary block-shaped connectors, so-called tongue-and-groove connectors, so-called dogbone-shaped connectors, T-shaped connectors, and the like.

According to at least one embodiment, cable protector 10 is removably attached to first side ramp 40 by: 1) elevating cable protector 10; 2) positioning connectors 32 of cable protector 10 directly over apertures 46 defined in first side ramp 40; 3) inserting connectors 32 into apertures 46; and 4) lowering cable protector 10. Persons of skill the art will recognize that any number of alternative methods and/or sequences may be used to removably attach cable protector 10 to first side ramp 40, particularly in light of the various possible shapes, structures, and configurations of connectors 32 and apertures 46.

As seen in the exemplary embodiments illustrated in FIGS. 1-2, second side ramp 50 may be removably attached to a side of cable protector 10 that opposes the side attached to first side ramp 40. Similar to first side ramp 40, second side ramp 50 may comprise a tapered structure having one or more male end connectors 52 and one or more female end connectors 54 formed on its ends. Generally speaking, end connectors 52, 54 may be formed of any shape or connecting structure known to those in the art; including, for example, hourglass-shaped connectors, complimentary block-shaped connectors, so-called dogbone-shaped connectors, so-called tongue-and-groove connectors, T-shaped connectors, and the like.

As illustrated in FIGS. 1-2, second side ramp 50 may also comprise one or more connectors 56 formed along a substantially vertical side wall that opposes its tapered side. In many embodiments, connectors 56 are substantially vertically oriented. Although connectors 56 are illustrated in FIG. 1 as extending generally downwards towards the ground, connectors 56 may also be configured to extend generally up and away from the ground. As with connectors 32, connectors 56 may be formed of any number of shapes or structures capable of interlocking with, or being inserted into, an opposing structure; including, for example, a substantially vertically extending protrusion, a ball-shaped structure capable of interconnecting with a socket to form a ball-and-socket joint, a cantilever configured to snap fit into a complimentary recess, or the like.

In at least one embodiment, connectors 56 are configured to be insertable into one or more apertures 34 formed in base member 12 of cable protector 10. In many embodiments apertures 34 are defined within base member 12 so as to be substantially vertically oriented; that is, apertures 34 may be defined within base member 12 so as to extend generally perpendicular to the horizontal plane defined by cover 18. In the exemplary embodiment illustrated in FIG. 1, apertures 34 are defined in a general slot shape that embodies the inverse of the dimensions of connectors 56. Alternatively, as with apertures 46, apertures 34 may be formed of any number of other shapes capable of receiving the various possible configurations of connectors 56 (described in greater detail above); including, for example, a circular socket (capable of interlocking with the ball-shaped embodiment of connector 56), a cubic or rectangular aperture or recess (capable of receiving the substantially vertical protrusion embodiment of connector 56), or the like. Connectors 56 may also be configured to snap fit into apertures 34 defined in cable protector 10 to removably attach second side ramp 50 to cable protector 10.

According to at least one embodiment, second side ramp 50 is removably attached to cable protector 10 by: 1) elevating second side ramp 50; 2) positioning connectors 56 of second side ramp 50 directly over apertures 34 defined in base member 12 of cable protector 10; 3) inserting connectors 56 into apertures 34; and 4) lowering second side ramp 50. Persons of skill the art will recognize that any number of alternative methods and/or sequences may be used to removably attach second side ramp 50 to cable protector 10, particularly in light of the various possible shapes, structures, and configurations of connectors 56 and apertures 34.

Figure 3:
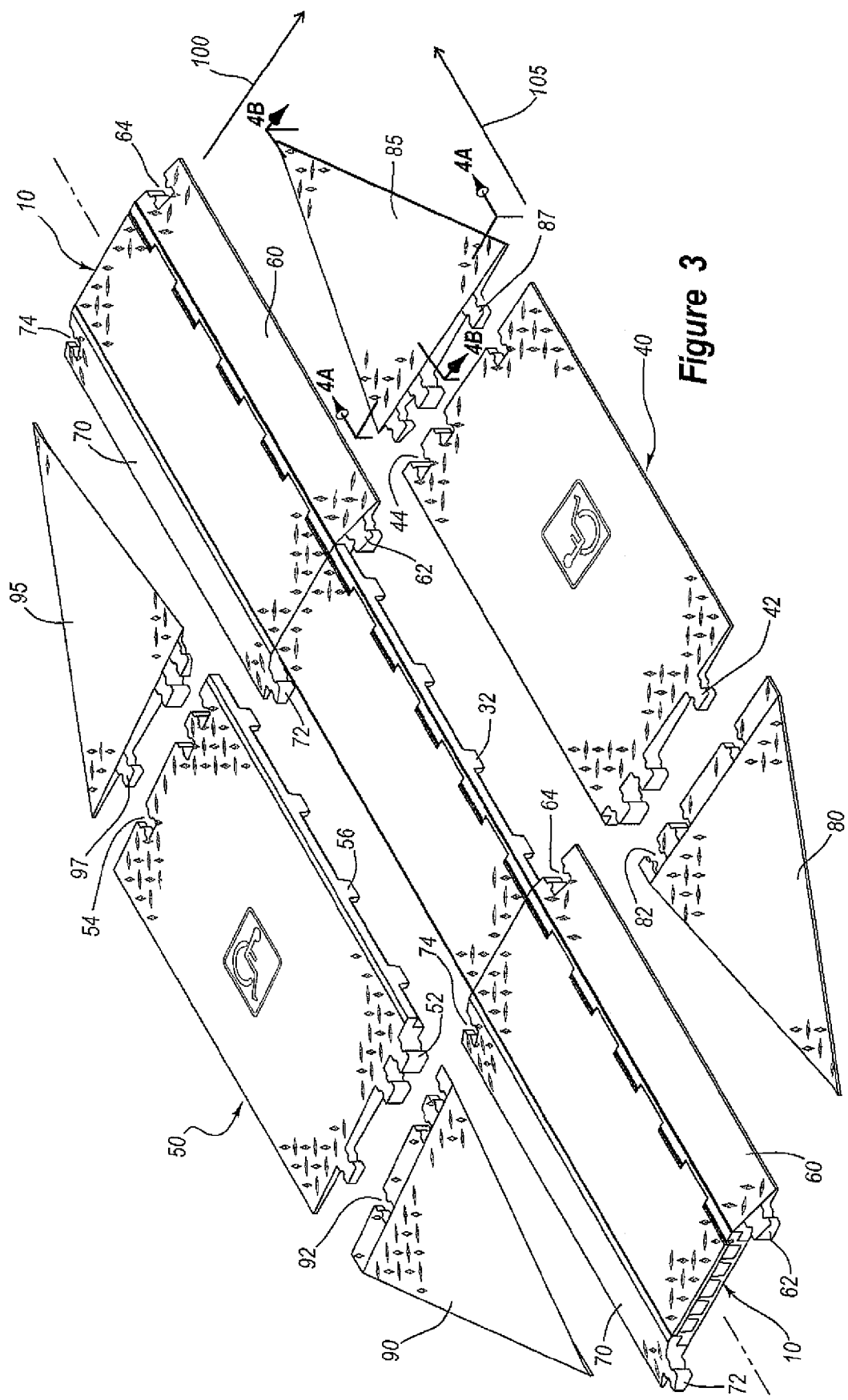
FIG. 3 is a partially assembled perspective view of the exemplary cable protection system illustrated in FIG. 1, further comprising a plurality of exemplary tapered transition structures.
Figure 5:
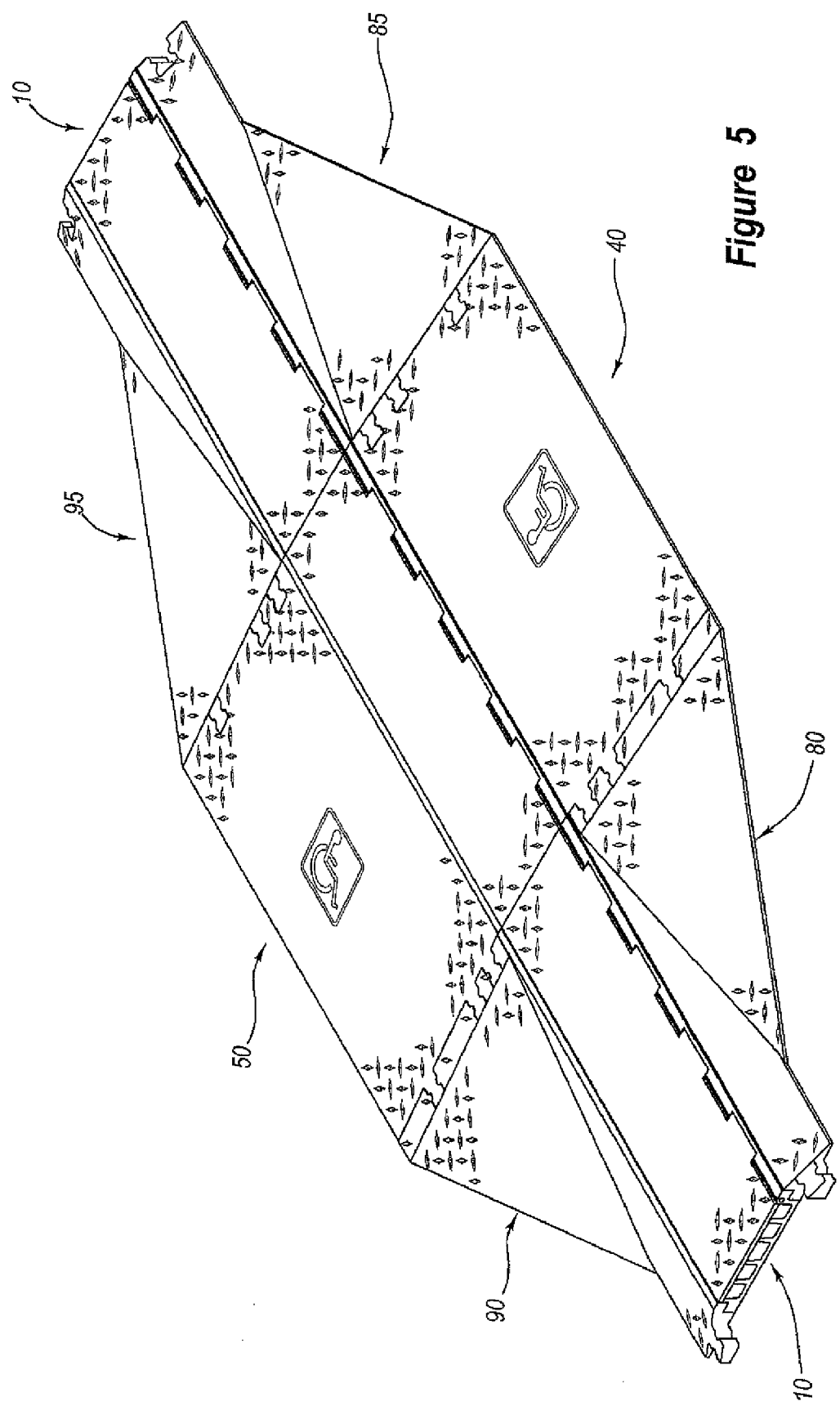
FIG. 5 is an assembled perspective view of the exemplary cable protection system illustrated in FIG. 3.

FIG. 3 is a partially assembled perspective view of the exemplary cable protection system illustrated in FIGS. 1-2, further comprising a plurality of exemplary tapered transition structures. FIG. 5 is an assembled perspective view of the exemplary cable protection system illustrated in FIG. 3. As seen in these figures, a plurality of cable protectors 10 may be removably attached together in an end-to-end fashion to extend the exemplary cable protection system across roadways or walkways of varying widths and/or to accommodate cables of varying lengths. In addition, one or more side ramps 60, 70 may be removably attached to these additional cable protectors 10 in a manner similar to ramps 40, 50. In at least one embodiment, side ramps 60, 70 are configured to have a slope that is significantly steeper than the slope of first and second side ramps 40, 50. Similar to first and second side ramps 40, 50, side ramps 60, 70 may additionally comprise one or more male end connectors 62, 72 and one or more female end connectors 64, 74 for facilitating the end-to-end connection of one or more ramps and/or one or more cable protectors. As with the end connectors described in connection with previous embodiments, male end connectors 62, 72 and/or female end connectors 64, 74 may be formed on each opposing end of ramps 60, 70. In addition, although illustrated in FIG. 3 as being formed in a general hourglass shape, end connectors 62, 64, 72, and 74 may be formed of any shape or connecting structure known to those in the art; including, for example, complimentary block-shaped connectors, so-called tongue-and-groove connectors, so-called dogbone-shaped connectors, T-shaped connectors, and the like.

As seen in FIG. 3, this exemplary cable protection system may further comprise a plurality of tapered transition structures 80, 85, 90, and 95 removably attachable to the ends of ramps 40, 50. In at least one embodiment, tapered transition structures 80, 85, 90, and 95 comprise one or more male end connectors 87, 97 and/or one or more female end connectors 82, 92 to facilitate the removable attachment of tapered transition structures 80, 85, 90, and 95 to first and second side ramps 40, 50. For example, as seen in FIGS. 3 and 5, tapered transition structure 80 may comprise one or more female end connectors 82 configured to receive the complimentary-shaped male end connectors 42 formed on an end of first side ramp 40, while tapered transition structure 90 may comprise one or more female end connectors 92 configured to receive the complimentary-shaped male end connectors 52 formed on an end of second side ramp 50. Similarly, tapered transition structure 85 may comprise one or more male end connectors 87 configured to be insertable into the complimentary-shaped female end connectors 44 defined in an end of first side ramp 40, while tapered transition structure 95 may comprise one or more male end connectors 97 configured to be insertable into the complimentary-shaped female end connectors 54 defined in an end of second side ramp 50.

As illustrated in FIGS. 3 and 5, tapered transition structures 80, 85, 90, and 95 may taper in both a first direction and a second direction. For example, as illustrated in FIGS. 3, 4A (which is an end view of tapered transition structure 85, taken along line 4A-4A in FIG. 3), and 4B (which is a side view of tapered transition structure 85, taken along line 4B-4B in FIG. 3), exemplary tapered transition structure 85 may taper in both a first direction 100 and a second direction 105. In at least one embodiment, first direction 100 is substantially orthogonal to second direction 105. In the exemplary embodiment illustrated in FIGS. 3-5, tapered transition structures 80, 85, 90, and 95 are configured to be substantially triangular in shape.

As best seen in FIGS. 4A and 4B, tapered transition structure 85 may comprise a top surface 86, a bottom surface 88, and an overlapping side portion 89. In certain embodiments, bottom surface 88 is configured to extend substantially parallel to, and rest evenly upon, a surface (such as the ground) below structure 85. Similarly, bottom surface 88 may be configured to be substantially level with the bottom surfaces of cable protector 10 and ramps 40, 50. Thus, when tapered transition structure 85 is removably attached to an end of first side ramp 40 (as illustrated in FIG. 5), the bottom surfaces of tapered structure 85 and first side ramp 40 may form a continuous, unitary bottom surface, enabling the combined assembly to evenly rest on the surface below.

In at least one embodiment, overlapping side portion 89 extends from an end of first and/or second side ramps 40, 50 and is configured to laterally overlap at least a portion of side ramps 60 and/or 70. The side ramps 60, 70 extend from ends of the first and second side ramps 40, 50, respectively, so that portions of the side ramps 60, 70 are spaced apart from the first and second side ramps 40, 50. For example, overlapping side portion 89 may be configured to have a slope substantially equal to the slope of ramps 60, 70, such that, when the exemplary cable protection system is completely assembled (as illustrated in FIG. 5), overlapping side portion 89 overlaps and evenly rests upon at least a portion of ramp 60, with bottom surface 88 of tapered transition structure 85 evenly resting upon the surface below the assembled cable protection system. In other words, overlapping side portion 89 may be configured such that, when the exemplary cable protection system is completely assembled, as illustrated in FIG. 5, all major gaps are eliminated between both: 1) overlapping side portion 89 and side ramp 60; and 2) bottom surface 88 of structure 85 and the surface (such as the ground) below the assembled cable protection system.

In at least one embodiment, top surface 86 of tapered structure 85 is configured to be substantially planar (i.e., flat or even, though not level). In other words, as seen in FIGS. 3-5, the entirety of tapered transition structure 85 may be configured to evenly taper in both first direction 100 and second direction 105, resulting in top surface 86 having a substantially flat or even surface to provide a smooth transition from cable protector 10 and/or first side ramp 40 to the ground below.

As with tapered transition structure 85, structures 80, 90, and 95 may comprise a top surface, a bottom surface, and an overlapping side portion. Similar to top surface 86, the top surfaces of these structures may be configured to evenly taper in both a first direction and a second direction, resulting in a substantially planar surface. The bottom surfaces of these structures, as with bottom surface 88, may be configured to extend substantially parallel to, and rest evenly upon, a surface (such as the ground) below the structures. In addition, the overlapping side portions of these structures may be configured to laterally overlap at least a portion of side ramps 60 and/or 70.

Generally speaking, exemplary tapered transition structures 80, 85, 90, and 95 effectively eliminate the need for conventional side ramps by providing a gradual transition between drop-offs present along the edges of conventional cable protection systems. Specifically, when the exemplary cable protection system is fully assembled (as illustrated in FIG. 5), tapered transition structures 80, 85, 90, and 95 simultaneously provide a smooth and gradual transition between: 1) the ends of ramps 40, 50 and the surface below the cable protection system; 2) the sides of cable protectors 10 and the surface below the cable protection system; and 3) the ends of ramps 40, 50 and the top surfaces of ramps 60, 70. Wheelchairs, walkers, strollers, and the like may thus approach and cross over the assembled cable protection system from a wide range of directions and angles without fear of falling off the edge of the ramp or cable protector and without fear of running into vertically extending protrusions, such as conventional side rails. Tapered transition structures 80, 85, 90, and 95 thus simply and safely eliminate the need for conventional side rails.

Figure 6:
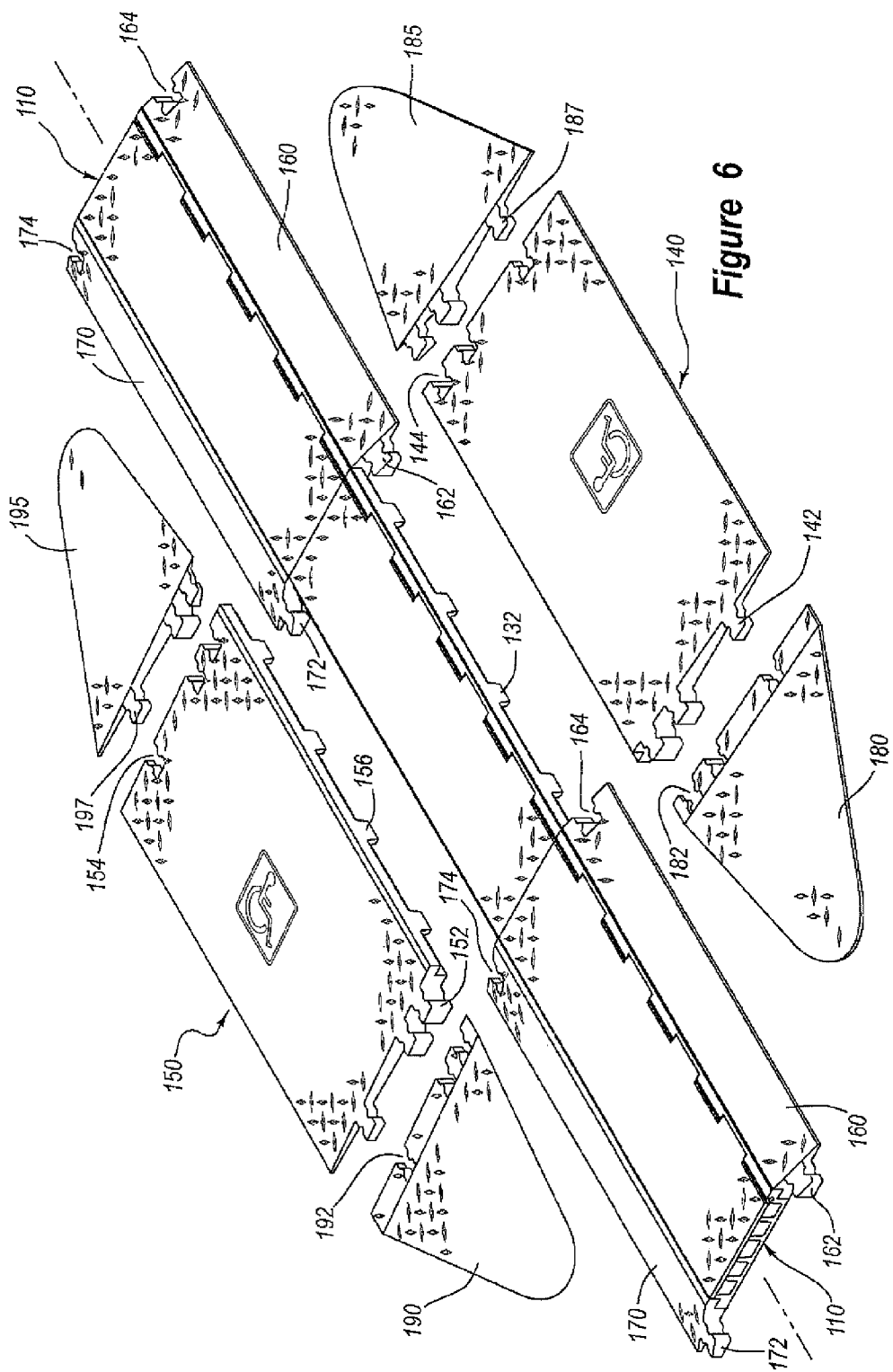
FIG. 6 is a partially assembled perspective view of an exemplary cable protection system according to an additional embodiment.

Although the various elements of the exemplary cable protection systems illustrated in FIGS. 1-5 have been described and illustrated with a certain degree of particularity, persons of ordinary skill in the art will appreciate that each element in this exemplary system may be formed in any number of suitable shapes and sizes. In particular, although tapered transition structures 80, 85, 90, and 95 have been described and illustrated herein as being substantially triangular in shape, these transition structures may be formed in any number of other suitable shapes and sizes, such as a square, rectangle, semicircle, or the like. For example, as illustrated in FIG. 6, in at least one embodiment tapered transition structures 180, 185, 190, and 195 may comprise at least one rounded end. Tapered transition structures 180, 185, 190, and 195 and ramps 140, 150, 160, and 170 may also be modified to have a more gradual or less gradual slope, as desired.

Figure 7:
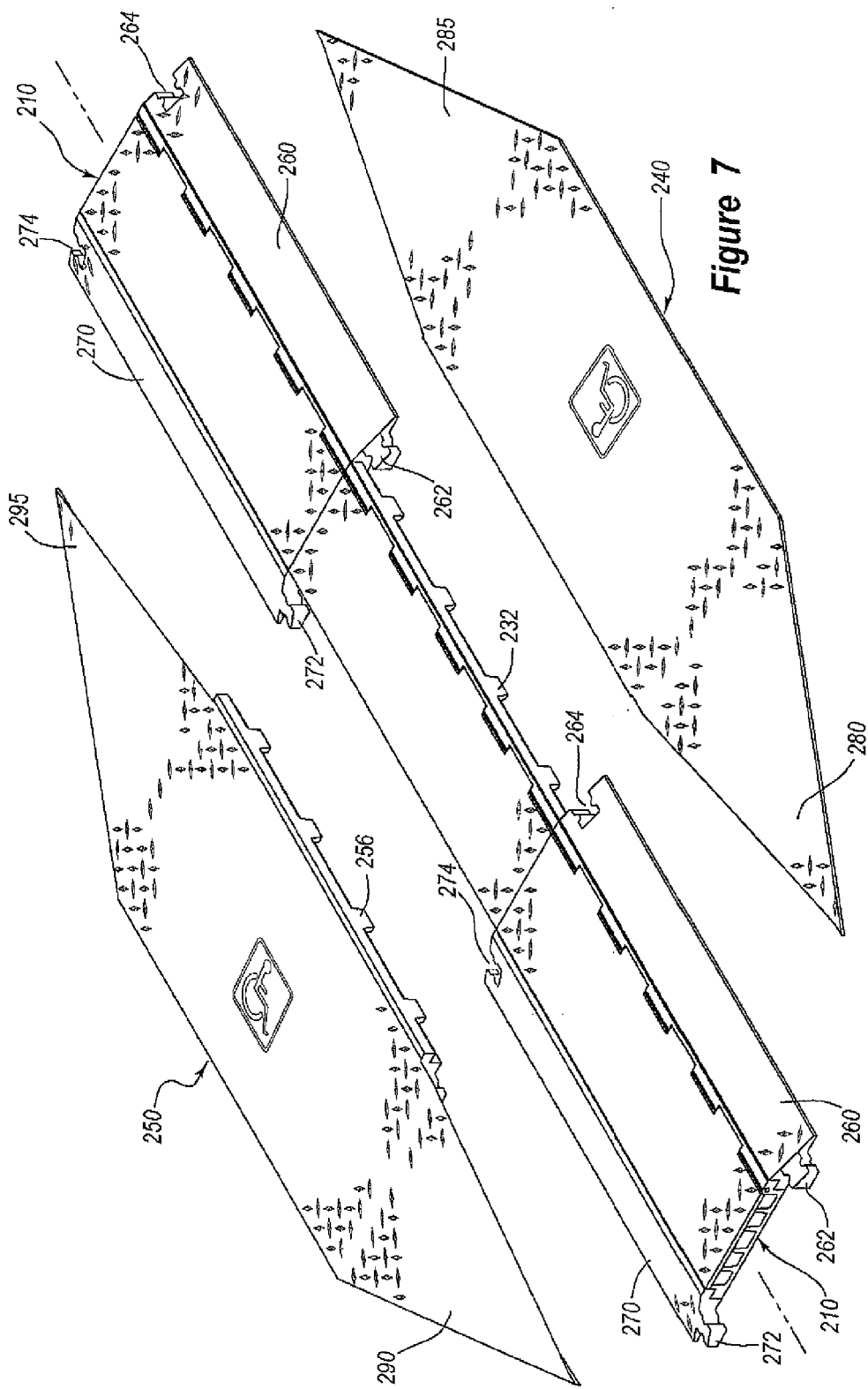
FIG. 7 is a partially assembled perspective view of an exemplary cable protection system according to an additional embodiment.

Additionally or alternatively, one or more of the elements described and illustrated in connection with FIGS. 1-6 may be integrally formed with, as opposed to being removably attached to, one another. For example, as illustrated in FIG. 7, tapered transition structures 280 and 285 may be integrally formed with first side ramp 240, as opposed to being removably attachable thereto (as with tapered transition structures 80 and 85 illustrated in FIGS. 3-5). Similarly, tapered transition structures 290 and 295 may be integrally formed with second side ramp 250, as opposed to being removably attachable thereto (as with tapered transition structures 90 and 95 illustrated in FIGS. 3-5). One or more of ramps 240, 250, 260, and 270 may also be integrally formed with, as opposed to being removably attachable to, cable protectors 210.

In an additional embodiment, one or more tapered transition structures may be pivotally attached to a side ramp. For example, as seen in the exploded top and bottom perspective views illustrated in FIGS. 8 and 9, respectively, one or more tapered transition structures 390, 395 may be pivotally attached to a side ramp 350. As with previous embodiments, side ramp 350 may be removably attachable to a cable protector or cable protection system, such as cable protector 10 illustrated in FIG. 2.

Figure 9:
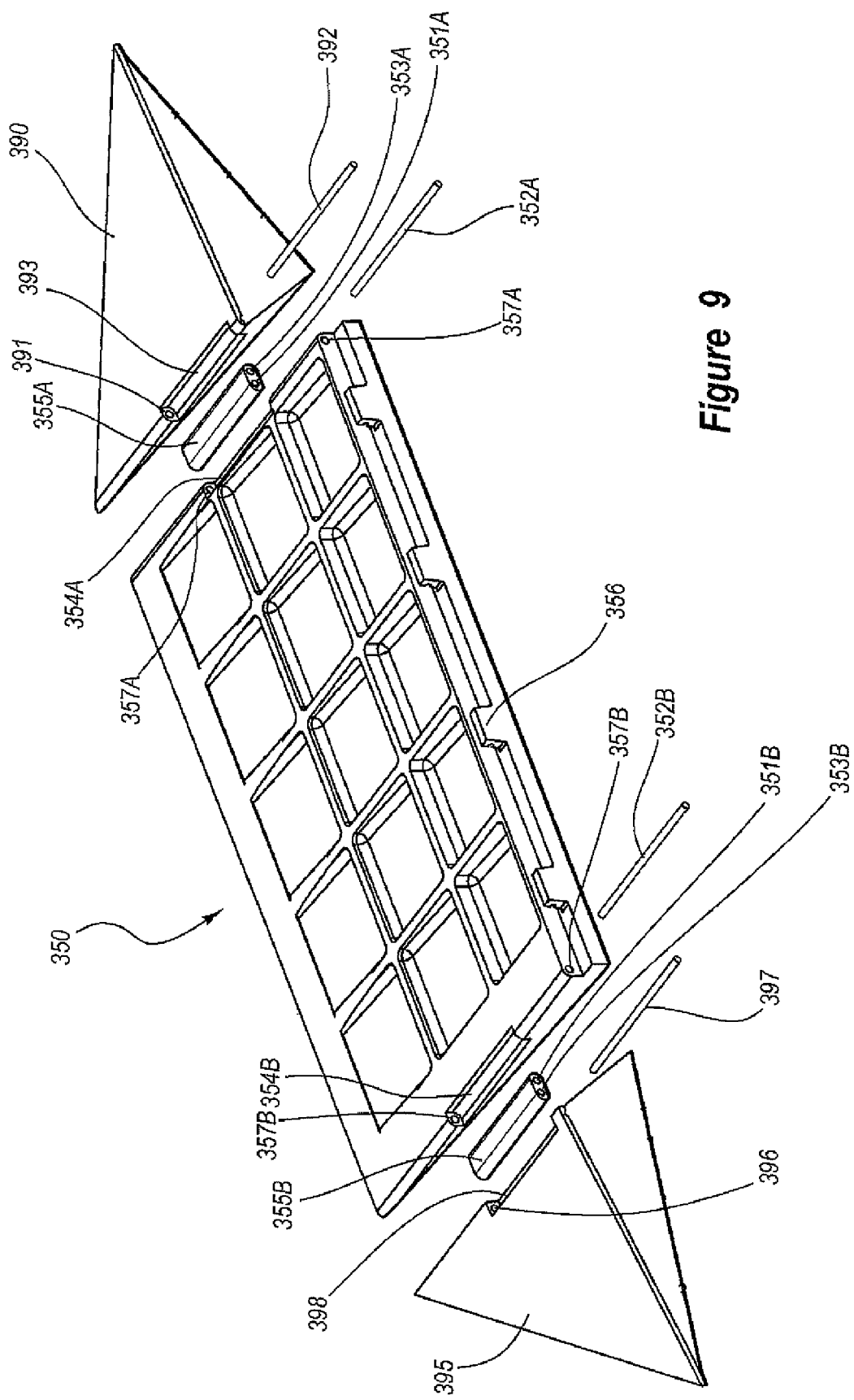
FIG. 9 is an exploded bottom perspective view of the exemplary side ramp assembly illustrated in FIG. 8.

Tapered transition structures 390 and 395 may be pivotally attached to side ramp 350 in any number of ways using any number of structures. For example, as illustrated in FIG. 9, tapered transition structures 390 and 395 may be pivotally attached to side ramp 350 using one or more hinge structures 355A and 355B, which generally represent any type of hinge structure capable of pivotally attaching tapered transition structures 390 and 395 to side ramp 350. Additionally or alternatively, tapered transition structures 390 and 395 may be pivotally attached to side ramp 350 using a flush hinge assembly, a barrel hinge assembly, a butt hinge assembly, a concealed hinge assembly, or any other structure or assembly capable of pivotally attaching tapered transition structures 390 and 395 to side ramp 350.

In at least one embodiment, a hinge structure 355A may be partially disposed within a complimentary-shaped recess 393 defined in tapered transition structure 390. Similarly, an additional hinge structure 355B may be partially disposed within a complimentary-shaped recess 398 defined in tapered transition structure 395. In certain embodiments, hinge structure 355A may be retained within recess 393 and coupled to tapered transition structure 390 by inserting a first rod member 392 through both a cylindrical passageway 391 defined in tapered transition structure 390 and a first cylindrical aperture 353 defined in hinge structure 355A. Similarly, hinge structure 355B may be retained within recess 398 and coupled to tapered transition structure 395 by inserting a first rod member 397 through both a cylindrical passageway 396 defined in tapered transition structure 395 and a first cylindrical aperture 353 defined in hinge structure 355B.

Tapered transition structure 390 may then be pivotally attached to side ramp 350 by positioning hinge structure 355A within a recess 354A defined in side ramp 350 and inserting a second rod member 352A through both a cylindrical passageway 357A defined in side ramp 350 and a second cylindrical aperture 351A defined in hinge structure 355A. Similarly, tapered transition structure 395 may be pivotally attached to side ramp 350 by positioning hinge structure 355B within a recess 354B defined in side ramp 350 and inserting a second rod member 352B through both a cylindrical passageway 357B defined in side ramp 350 and a second cylindrical aperture 351B defined in hinge structure 355B.

Figure 8:
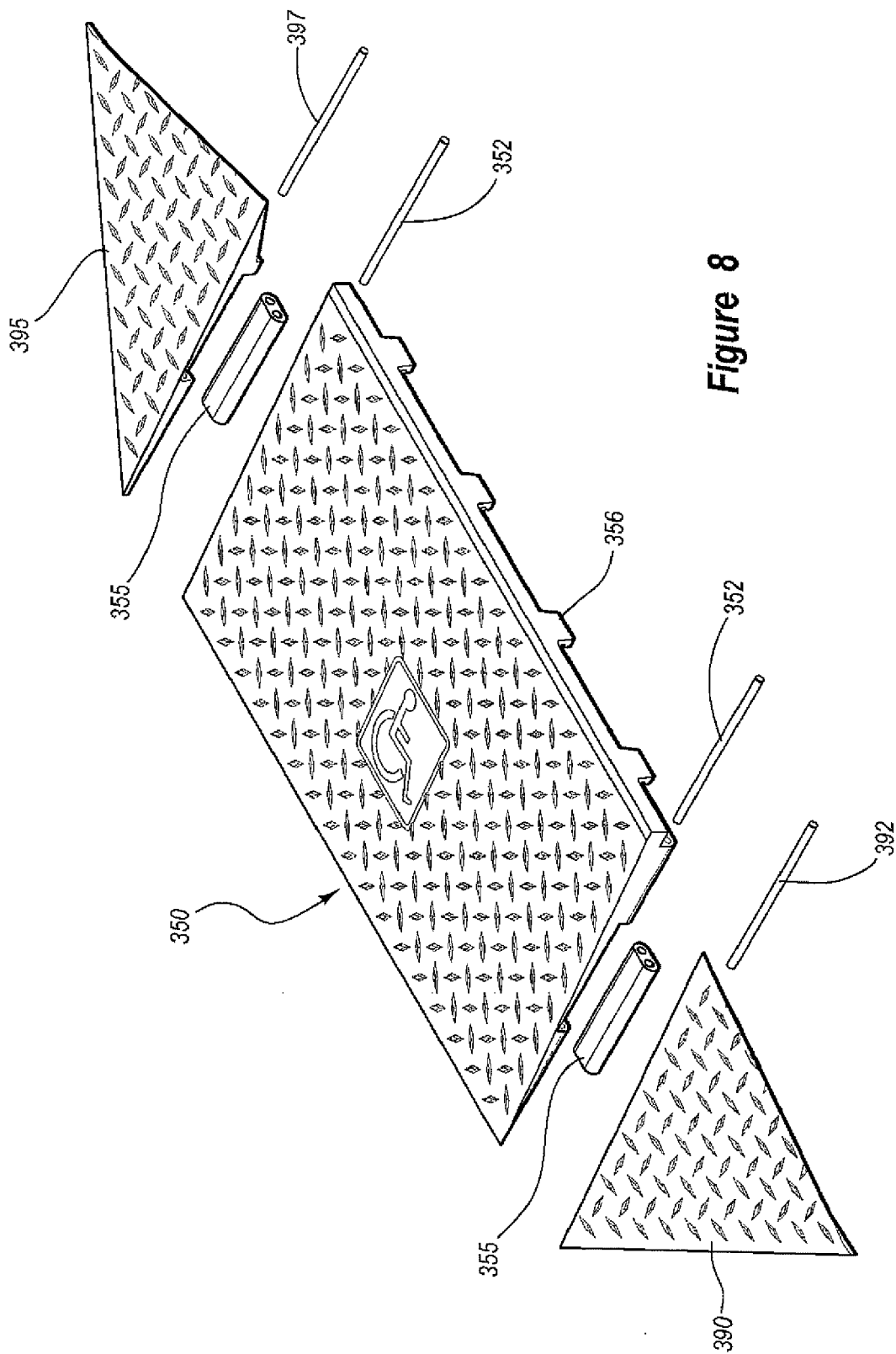
FIG. 8 is an exploded top perspective view of an exemplary side ramp assembly for a cable protection system according to at least one embodiment.
Figure 10:
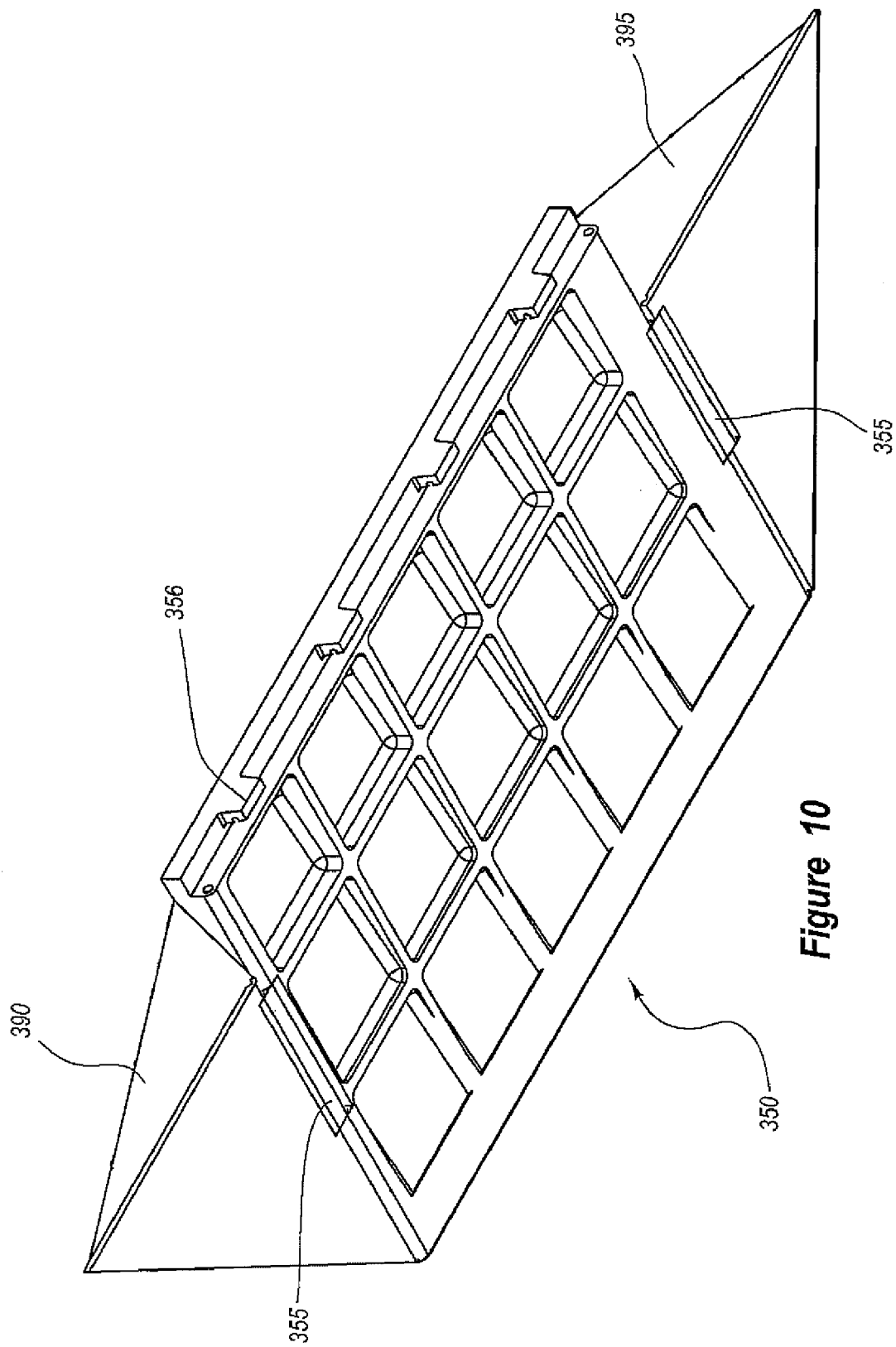
FIG. 10 is an assembled bottom perspective view of the exemplary side ramp assembly illustrated in FIG. 8.

In at least one embodiment, the various elements of the hinge assembly illustrated in FIGS. 8-10 may enable tapered transition structures 390 and 395 to freely pivot relative to side ramp 350. For example, as illustrated in the cross-sectional side views of FIGS. 11B and 11C, tapered transition structures 390 and 395 may pivot from a first open position (illustrated in FIGS. 11A and 11B) to a second closed position (illustrated in FIG. 11C). When in a closed position, the bottom surfaces of tapered transition structures 390 and 395 may rest upon the bottom surfaces of side ramp 350.

Figure 12:
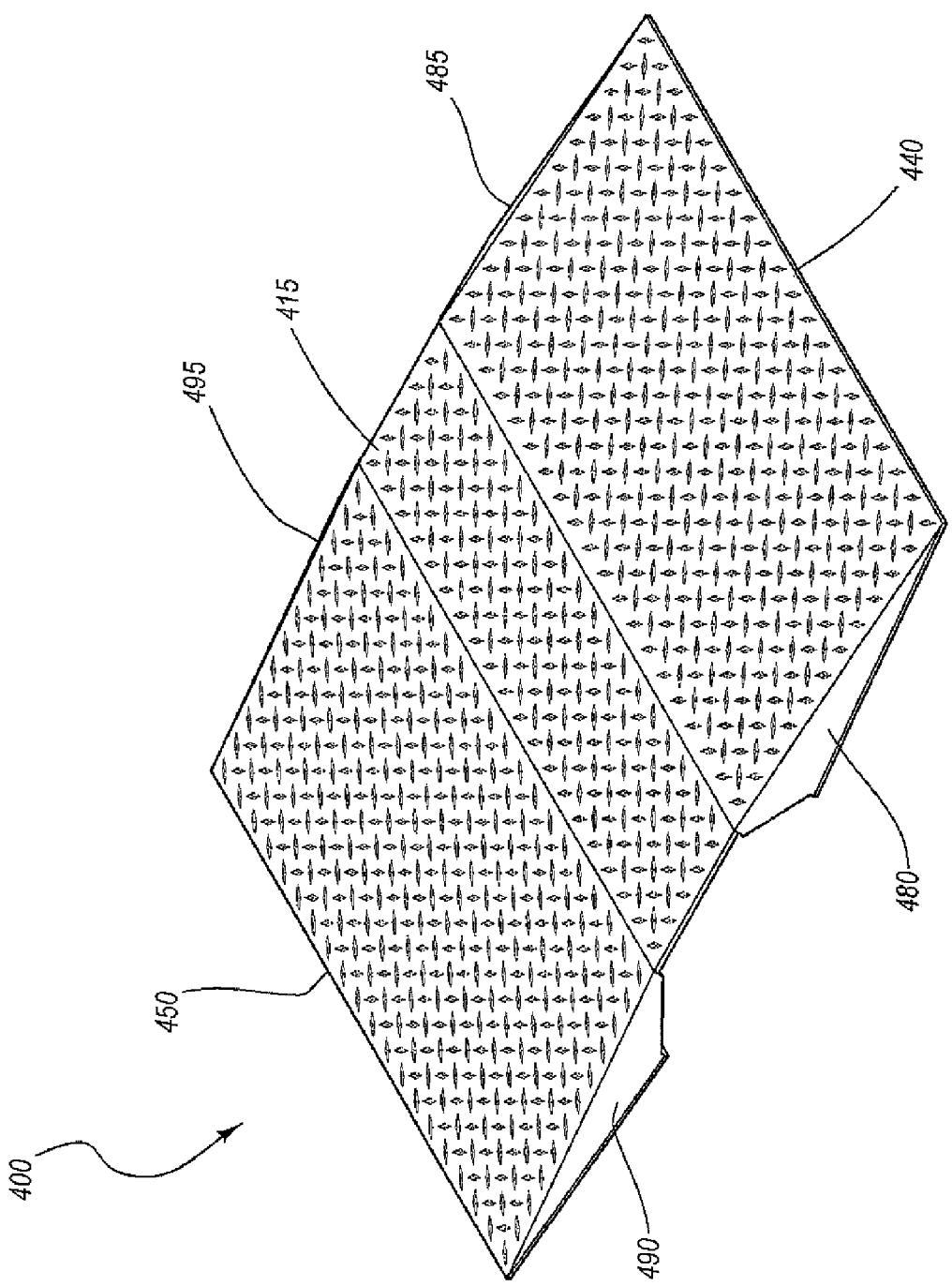
FIG. 12 is a perspective view of an exemplary ramp structure for a cable protection system according to at least one embodiment.

As detailed above, one or more of the elements described and illustrated herein may be integrally formed with, as opposed to being removably attached to, one another. For example, as seen in the perspective and top views illustrated in FIGS. 12 and 13, respectively, an exemplary ramp structure 400 may comprise a first side ramp portion 440 and a second side ramp portion 450 integrally formed with a center portion 415, to form a bridge structure over a cable protector housing. Exemplary ramp structure 400 may also comprise a plurality of tapered transition portions 480 and 485 integrally formed with first side ramp portion 440 and a plurality of tapered transition portions 490 and 495 integrally formed with second side ramp portion 450. Tapered transition portions 480, 485, 490, and 495 may be formed in any shape or size. For example, as illustrated in FIGS. 12-13, tapered transition portions 480, 485, 490, and 495 may be substantially triangular in shape.

As with the tapered transition structures illustrated in FIGS. 3-11, tapered transition portions 480, 485, 490, and 495 may taper in both a first direction and a second direction. For example, as illustrated in FIGS. 13, 14A (which is an end view of exemplary ramp structure 400, taken along line 14A-14A in FIG. 13), and 14B (which is a side view of exemplary ramp structure 400, taken along line 14B-14B in FIG. 13), exemplary tapered transition portion 480 may taper in both a first direction 402 and a second direction 404. In at least one embodiment, first direction 402 is substantially orthogonal to second direction 404.

As best seen in FIGS. 14A and 14B, tapered transition portion 480 may comprise a top surface 482, a bottom surface 484, and an overlapping side portion 483. In certain embodiments, bottom surface 484 is configured to extend substantially parallel to, and rest evenly upon, a surface (such as the ground) below ramp structure 400. Thus, the bottom surfaces of tapered transition portion 480 and first side ramp portion 440 may form a continuous, unitary bottom surface, enabling ramp structure 400 to evenly rest on the surface below.

Figure 15:
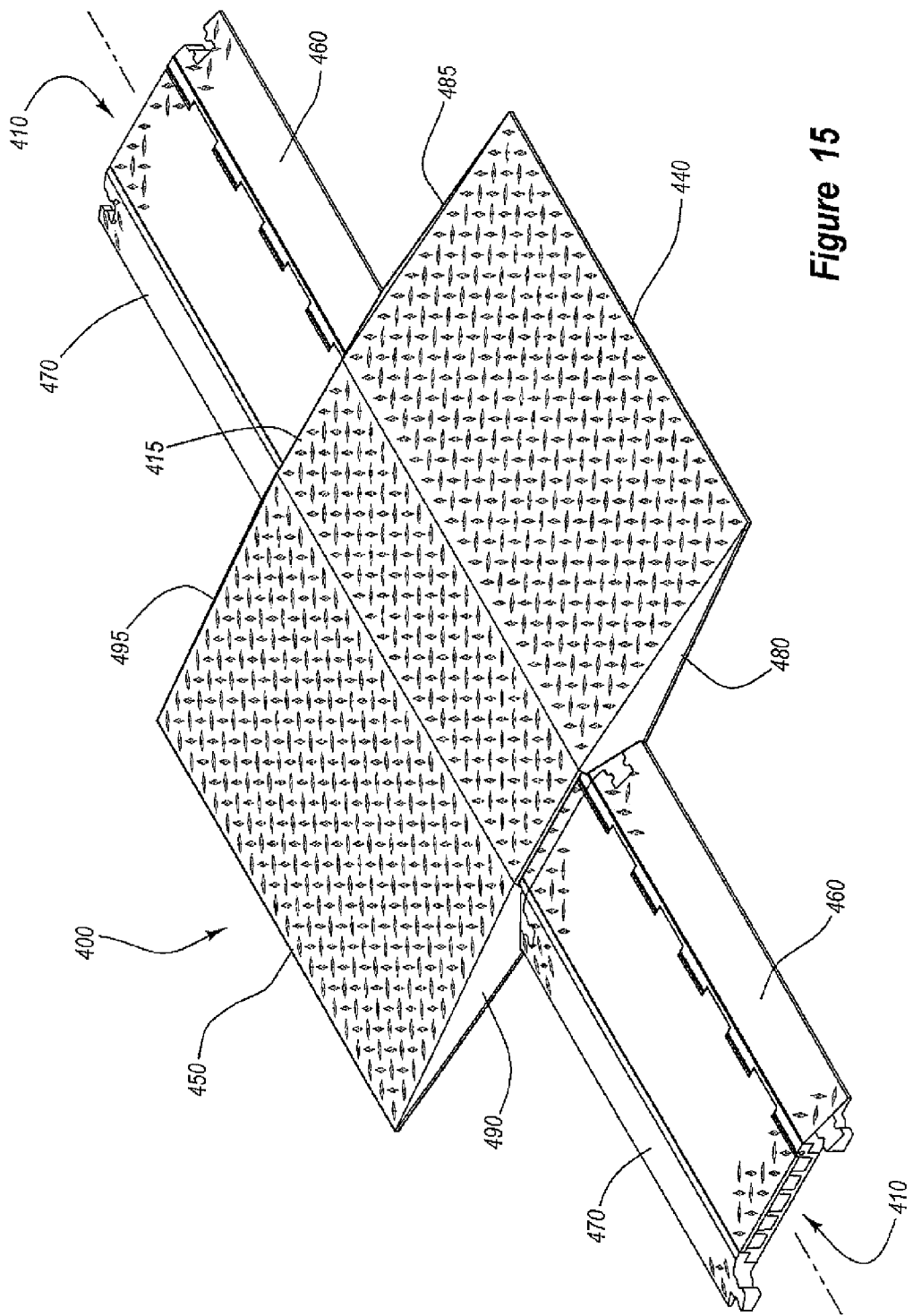
FIG. 15 is a perspective view of an exemplary ramp structure positioned over a cable protection system according to at least one embodiment.

In at least one embodiment, ramp structure 400 may be configured to be positioned over at least a portion of an additional cable protector or cable protection system. For example, as illustrated in FIGS. 14A and 15, a recess 417 configured to receive a portion of an additional cable protector or cable protection system may be defined on the underside of ramp structure 400. Accordingly, ramp structure 400 provides a bridge from one side of a cable protector to another, with a ramp on each side ending at approximately a support surface level. In at least one embodiment, the overlapping side portions of tapered transition portions 480, 485, 490, and 495 that define recess 417 may be configured to laterally overlap at least a portion of an additional cable protector or cable protection system, such as cable protector 410 and/or ramps 460 and 470. For example, as illustrated in FIG. 15, overlapping side portion 483 of tapered transition portion 480 may be configured to have a slope substantially equal to the slope of ramp 460 attached to exemplary cable protector 410, such that, when cable protector 410 and ramps 460, 470 are positioned within recess 417 of ramp structure 400, overlapping side portion 483 overlaps and evenly rests upon at least a portion of ramp 460, with bottom surface 484 of tapered transition portion 480 evenly resting upon the support surface below cable protector 410 and ramp structure 400. In other words, overlapping side portion 483 may be configured such that, when ramp structure 400 is positioned over cable protector 410 and ramps 460 and 470, as illustrated in FIG. 15, all major gaps are eliminated between both: 1) overlapping side portion 483 and ramp 460; and 2) bottom surface 484 of tapered transition portion 480 and the support surface (e.g., the ground) below the assembled cable protection system.

In at least one embodiment, top surface 482 of tapered transition portion 480 is configured to be substantially planar (i.e., flat or even, though not level). In other words, as seen in FIGS. 12 and 15, the entirety of tapered transition portion 480 may be configured to evenly taper in both first direction 402 and second direction 404, resulting in top surface 482 having a substantially flat or even surface to provide a smooth transition from ramp structure 400, cable protector 410, and/or first side ramp portion 440 to the ground below.

As with tapered transition portion 480, portions 485, 490, and 495 may comprise a top surface, a bottom surface, and an overlapping side portion. Similar to top surface 482, the top surfaces of these structures may be configured to evenly taper in both a first direction and a second direction, resulting in a substantially planar surface. The bottom surfaces of these structures, as with bottom surface 484, may be configured to extend substantially parallel to, and rest evenly upon, a surface (such as the ground) below the structures. In addition, the overlapping side portions of these structures may be configured to laterally overlap at least a portion of ramps 460 and/or 470.

As will be appreciated by those of skill in the art, the exemplary cable protection systems and ramp structures illustrated in FIGS. 1-15 may be adapted to house any number of cables and/or to extend over roadways and walkways of varying lengths. For example, any number of cable protectors in these exemplary systems may be removably attached together in a side-by-side fashion so as to house greater or lesser numbers of cables. Specifically, connectors formed on the side of a first cable protector may be removably inserted into apertures defined in the side of a second cable protector to removably attach the two cable protectors together in a side-by-side fashion. Additional cable protectors may be attached to either side of this assembly to increase the cable-housing capacity of the system as needed.

Similarly, any number of cable protectors in this exemplary system may be removably attached together in an end-to-end fashion to extend the exemplary cable protection system across roadways or walkways of varying widths. For example, as illustrated in FIG. 5, one or more cable protectors 10 may be removably attached together in an end-to-end fashion by one or more ramps 60, 70. Additionally or alternatively, cable protectors 10 may be removably attached together in an end-to-end fashion using one or more end connectors provided on opposing ends of the cable protectors 10. As will be appreciated by those of skill in the art, mixing and matching the various "building blocks" of these exemplary cable protection systems in this manner enables a user to form a system capable of housing any number of cables and/or extending over roadways and walkways of varying lengths. The flexibility of the system as a whole is thus increased, resulting in greater ease of use and interchangeability of parts.

Although the various cable protectors embodiments described and illustrated herein show a cover structure pivotally attached to a base member, various alternative arrangements and configurations fall within the scope of the instant disclosure. For example, the cover structure may be snap fit or otherwise removably attached to the base member. Alternatively, the cable protector may comprise a unitary base member/cover structure having an open base defining a single channel for covering one or more cables.

In addition, although the various cable protector embodiments illustrated herein have been described as having one or more connectors formed on a first side of the base member and one or more apertures formed on an opposing side of the base member, various alternative arrangements and configurations fall within the scope of the instant disclosure. For example, the base members may be formed with connectors on both sides, or may have apertures defined in each of its sides. Similarly, the base members may be formed such that a connector is formed on the same side as an aperture.

The elements of the exemplary cable protection systems and ramp structures illustrated in FIGS. 1-15, such as the cable protectors, side ramps, tapered transition structures, and integral ramp structures illustrated in these figures, may be formed of any number or combination of suitable materials. For example, the elements of these exemplary systems and structures may be molded of a rigid, high-strength plastic material capable of withstanding repeated loadings and stresses. Alternatively or additionally, these elements may be formed of various metallic elements, such as steel or iron. In addition, metal or plastic plating or gripping may be formed on the upper surfaces of one or more of these elements, as illustrated in FIG. 1, to improve the traction of pedestrians or vehicles traveling over the cable protection system.

In addition, the various elements of the exemplary cable protection systems and ramp structures described and illustrated herein may be of any color or opacity. For example, in at least one embodiment the various elements in these systems and structures may be brightly or fluorescently colored to increase the conspicuousness of the system. Additionally or alternatively, the elements in these systems and structures may be formed of a generally or substantially transparent material and illuminated by white or colored light sources to increase the visibility of the system. Generally speaking, coloring or illuminating the various elements of these systems and structures in this manner helps decrease the likelihood of injuries to pedestrians or other motorists due to their failure to notice the cable protection system and/or ramp structure extended over walkways or roadways.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. For example, one or more elements of the exemplary cable protection systems and/or ramp structures described or illustrated herein may be modified as disclosed in U.S. patent application Ser. No. 11/263,099, filed 31 Oct. 2005, and entitled "Cable Protection System," the entirety of which is hereby incorporated by reference.

It is desired that the embodiments described herein be considered in all respects illustrative and not restrictive and that reference be made to the appended claims and their equivalents for determining the scope of the instant disclosure. In addition, for ease of use, the words "including" and "having," as used in the specification and claims, are interchangeable with and have the same meaning as the word "comprising."

What is claimed is:

1. A ramp structure of a cable protection system, the ramp structure comprising:
    a center portion having a first side, a second side, and opposing ends;
    a side ramp portion adjacent the first side of the center portion, the side ramp portion comprising a first end and a second end;
    a tapered portion extending from the first end of the side ramp portion, the tapered portion configured to overlap a portion of an adjacent side ramp portion that is spaced from the first end of the side ramp portion.

2. The ramp structure of claim 1, wherein the tapered portion comprises a top surface and a bottom surface, the top surface of the tapered portion being tapered in both a first direction and a second direction.

3. The ramp structure of claim 2, wherein the first direction is substantially orthogonal to the second direction.

4. The ramp structure of claim 1, wherein a top surface of the tapered portion is substantially planar.

5. The ramp structure of claim 1, wherein the tapered portion is integrally formed with the side ramp portion.

6. The ramp structure of claim 1, wherein the tapered portion is configured to overlap a tapered portion of the adjacent side ramp portion that has a greater slope than a slope of the side ramp portion.

7. The ramp structure of claim 6, wherein the first tapered portion provides a gradual transition between:
    the first end of the side ramp portion and a surface beneath the ramp structure; and
    the tapered portion of the adjacent side ramp portion and the surface beneath the cable protection system.

8. The ramp structure of claim 1, wherein the tapered portion includes a top surface and a bottom surface, the bottom surface including a first portion that is parallel with a surface beneath the ramp structure, and a second portion that is tapered at an angle relative to the first portion.

9. The ramp structure of claim 8, wherein the second portion of the bottom surface has a taper that substantially matches a slope of a top surface of the portion of the adjacent side ramp portion that is overlapped by the tapered portion.

10. A cable protection system, comprising:
    a cable protector comprising a first side, a second side, opposing ends, and at least one channel extending between the opposing ends, the at least one channel being structured to receive at least one cable;
    a side ramp adjacent the first side of the cable protector, the side ramp comprising a first side, a second side, a first end, and a second end;
    a tapered structure attachable to and extending from the first end of the side ramp, the tapered structure being configured to overlap a portion of an adjacent side ramp that is spaced from the first end of the side ramp.

11. The cable protection system of claim 10, wherein the tapered structure comprises a top surface and a bottom surface, the top surface of the tapered structure being tapered in both a first direction and a second direction.

12. The cable protection system of claim 10, wherein the tapered structure includes a top surface and a bottom surface, the bottom surface including a first portion that is parallel with a bottom surface of side ramp, and a second portion that is tapered at an angle relative to the first portion.

13. A side ramp assembly configured to be removably attachable to a side of a cable protector, the side ramp assembly comprising:
a side ramp having a first side, a second side, a first end, and a second end;
a tapered structure pivotally attachable to and extending from the first end of the side ramp, the tapered structure being configured to overlap a portion of an adjacent side ramp that is spaced from the first end of the side ramp.

14. The side ramp assembly of claim 13, wherein the tapered structure comprising a top surface and a bottom surface, the top surface of the tapered structure being tapered in both a first direction and a second direction.

15. The side ramp assembly of claim 13, wherein the tapered structure includes a top surface and a bottom surface, the bottom surface including first and second portions that are arranged at an angle relative to each other.

16. The side ramp assembly of claim 15, wherein the first portion of the bottom surface is arranged parallel with a surface beneath the ramp structure, and the second portion of the bottom surface is tapered at an angle that substantially matches a slope of a top surface of the portion of the adjacent side ramp.

17. A ramp structure of a cable protection system, the ramp structure comprising:
a center portion having a first side, a second side, and opposing ends;
a side ramp portion adjacent the first side of the center portion, the side ramp portion comprising a first end and a second end;
a tapered portion adjacent the first end of the first side ramp portion, the tapered portion having a top surface and a bottom surface, the bottom surface having a first portion that is parallel with a bottom surface of the ramp structure, and a second portion that is arranged at an angle relative to the first portion.

18. The ramp structure of claim 17, wherein the second portion of bottom surface overlaps an adjacent side ramp portion and the first portion of the bottom surface does not overlap the adjacent side ramp portion.

19. The ramp structure of claim 17, wherein the second portion of the bottom surface has a taper angle that substantially matches a slope of a top surface of an adjacent side ramp portion that is overlapped by the first tapered portion.

20. The ramp structure of claim 17, wherein the second portion of the bottom surface has a taper angle that is greater than a slope of a top surface of the first side ramp portion.

21. A ramp structure of a cable protection system, the ramp structure comprising:
a center portion having a first side, a second side, and opposing ends;
a side ramp portion adjacent the first side of the center portion, the side ramp portion comprising a first end and a second end;
a tapered portion adjacent the first end of the side ramp portion, the tapered portion configured to overlap a portion of an adjacent side ramp portion;
wherein the tapered portion is configured to overlap a tapered portion of the adjacent side ramp portion that has a greater slope than a slope of the side ramp portion.

22. The ramp structure of claim 21, wherein the tapered portion comprises a top surface and a bottom surface, the top surface of the tapered portion being tapered in both a first direction and a second direction.

23. The ramp structure of claim 22, wherein the first direction is substantially orthogonal to the second direction.

24. The ramp structure of claim 21, wherein a top surface of the tapered portion is substantially planar.

25. The ramp structure of claim 21, wherein the tapered portion is integrally formed with the side ramp portion.

26. The ramp structure of claim 21, wherein the first tapered portion provides a gradual transition between:
the first end of the side ramp portion and a surface beneath the ramp structure; and
the tapered portion of the adjacent side ramp portion and the surface beneath the cable protection system.

27. A ramp structure of a cable protection system, the ramp structure comprising:
a center portion having a first side, a second side, and opposing ends;
a side ramp portion adjacent the first side of the center portion, the side ramp portion comprising a first end and a second end;
a tapered portion adjacent the first end of the side ramp portion, the tapered portion configured to overlap a portion of an adjacent side ramp portion;
wherein the tapered portion includes a top surface and a bottom surface, the bottom surface including a first portion that is parallel with a surface beneath the ramp structure, and a second portion that is tapered at an angle relative to the first portion.

28. The ramp structure of claim 27, wherein the tapered portion comprises a top surface and a bottom surface, the top surface of the tapered portion being tapered in both a first direction and a second direction.

29. The ramp structure of claim 28, wherein the first direction is substantially orthogonal to the second direction.

30. The ramp structure of claim 27, wherein a top surface of the tapered portion is substantially planar.

31. The ramp structure of claim 27, wherein the tapered portion is integrally formed with the side ramp portion.

32. The ramp structure of claim 27, wherein the second portion of the bottom surface has a taper that substantially matches a slope of a top surface of the portion of the adjacent side ramp portion that is overlapped by the tapered portion.

33. A cable protection system, comprising:
a cable protector comprising a first side, a second side, opposing ends, and at least one channel extending between the opposing ends, the at least one channel being structured to receive at least one cable;
a side ramp adjacent the first side of the cable protector, the side ramp comprising a first side, a second side, a first end, and a second end;
a tapered structure attachable to the first end of the side ramp, the tapered structure being configured to overlap a portion of an adjacent side ramp;
wherein the tapered structure includes a top surface and a bottom surface, the bottom surface including a first portion that is parallel with a bottom surface of side ramp, and a second portion that is tapered at an angle relative to the first portion.

34. The cable protection system of claim 33, wherein the tapered structure comprises a top surface and a bottom surface, the top surface of the tapered structure being tapered in both a first direction and a second direction.

35. A side ramp assembly configured to be removably attachable to a side of a cable protector, the side ramp assembly comprising:
a side ramp having a first side, a second side, a first end, and a second end;

a tapered structure pivotally attachable to the first end of the side ramp, the tapered structure being configured to overlap a portion of an adjacent side ramp;

wherein the tapered structure includes a top surface and a bottom surface, the bottom surface including first and second portions that are arranged at an angle relative to each other.

36. The side ramp assembly of claim 35, wherein the tapered structure comprising a top surface and a bottom surface, the top surface of the tapered structure being tapered in both a first direction and a second direction.

37. The side ramp assembly of claim 35, wherein the first portion of the bottom surface is arranged parallel with a surface beneath the ramp structure, and the second portion of the bottom surface is tapered at an angle that substantially matches a slope of a top surface of the portion of the adjacent side ramp.

* * * * *